Nov. 3, 1964

L. MALAVASI 3,155,054

MACHINE FOR KNEADING RAISED DOUGH

Filed July 17, 1962

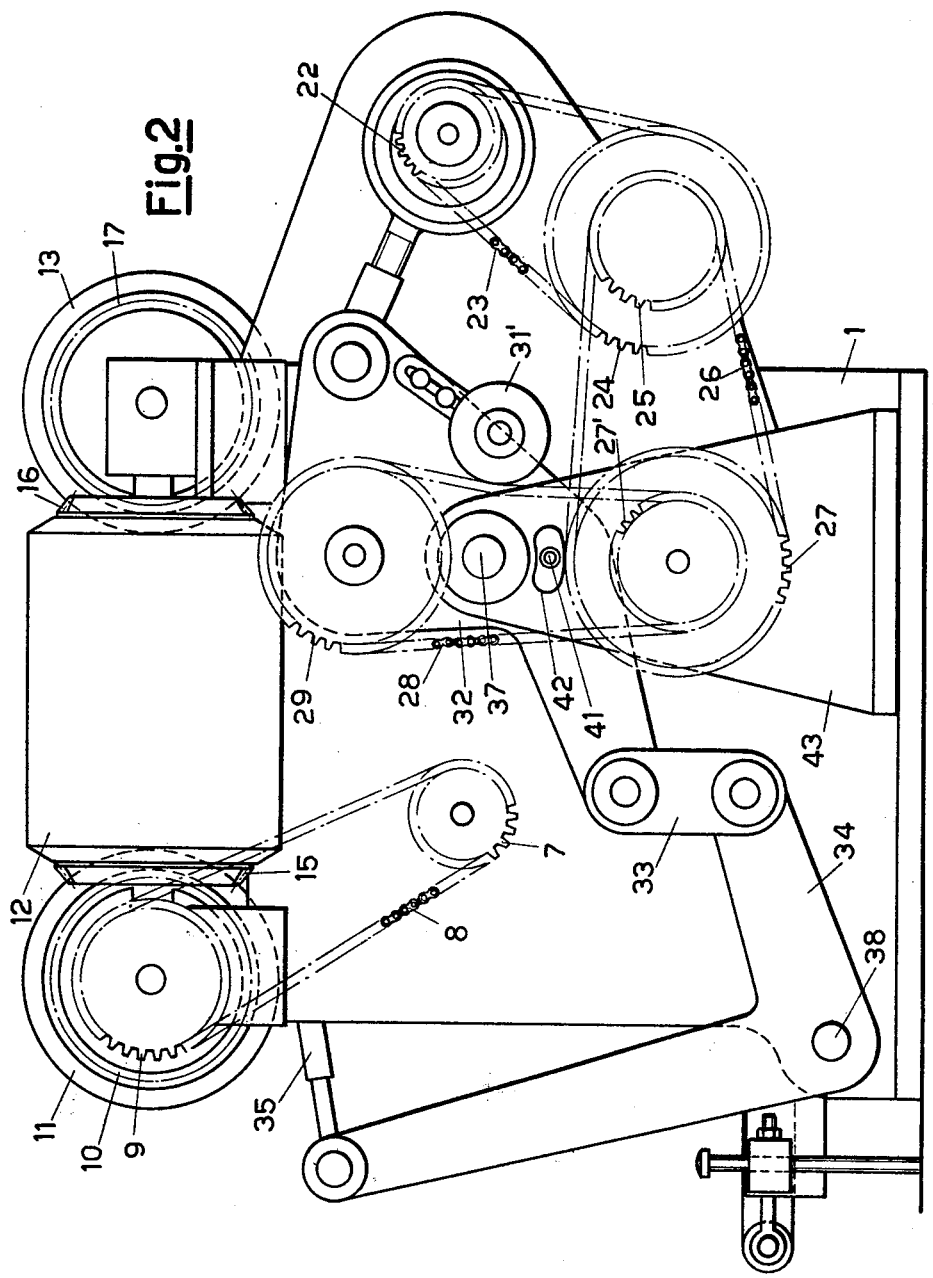

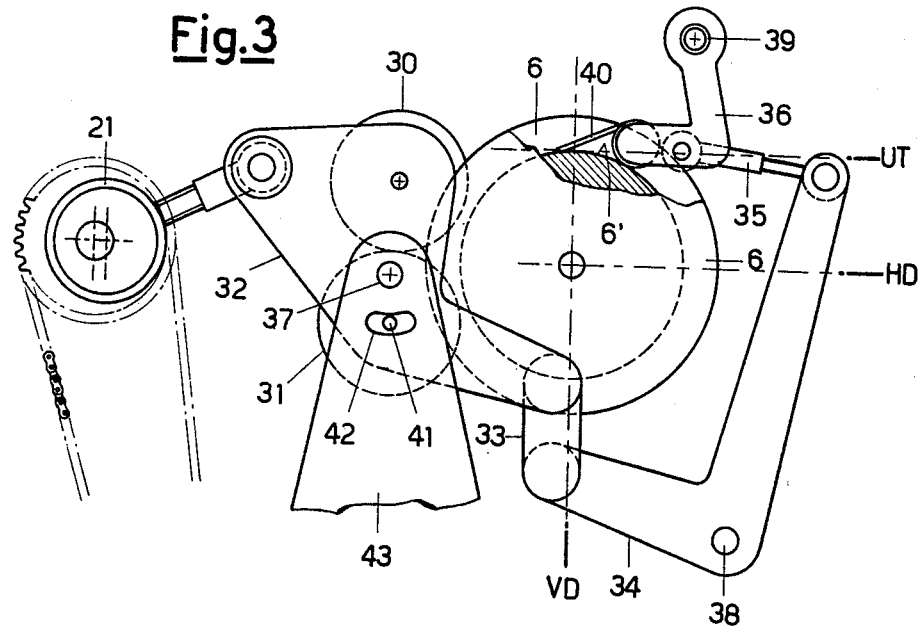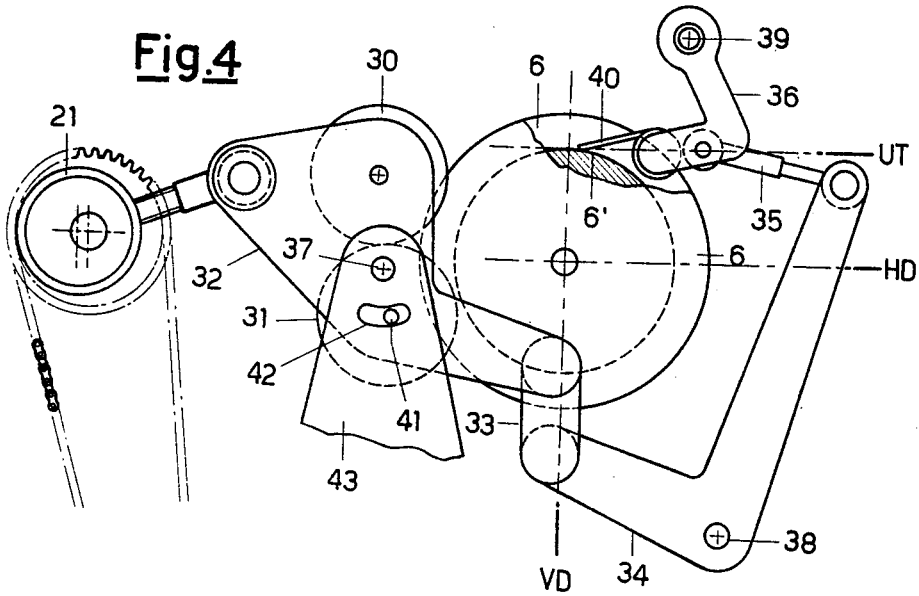

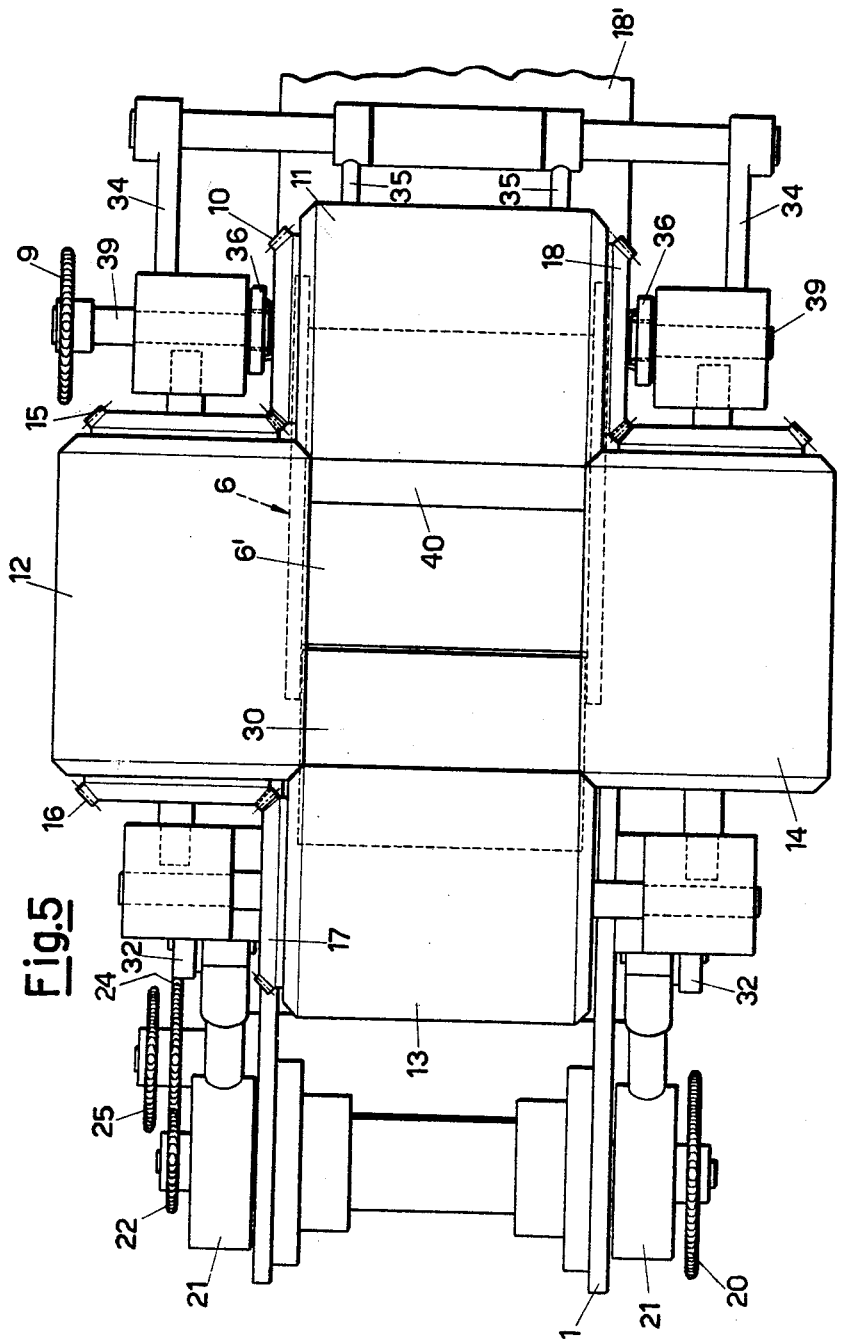

Nov. 3, 1964  L. MALAVASI  3,155,054
MACHINE FOR KNEADING RAISED DOUGH
Filed July 17, 1962  7 Sheets-Sheet 5
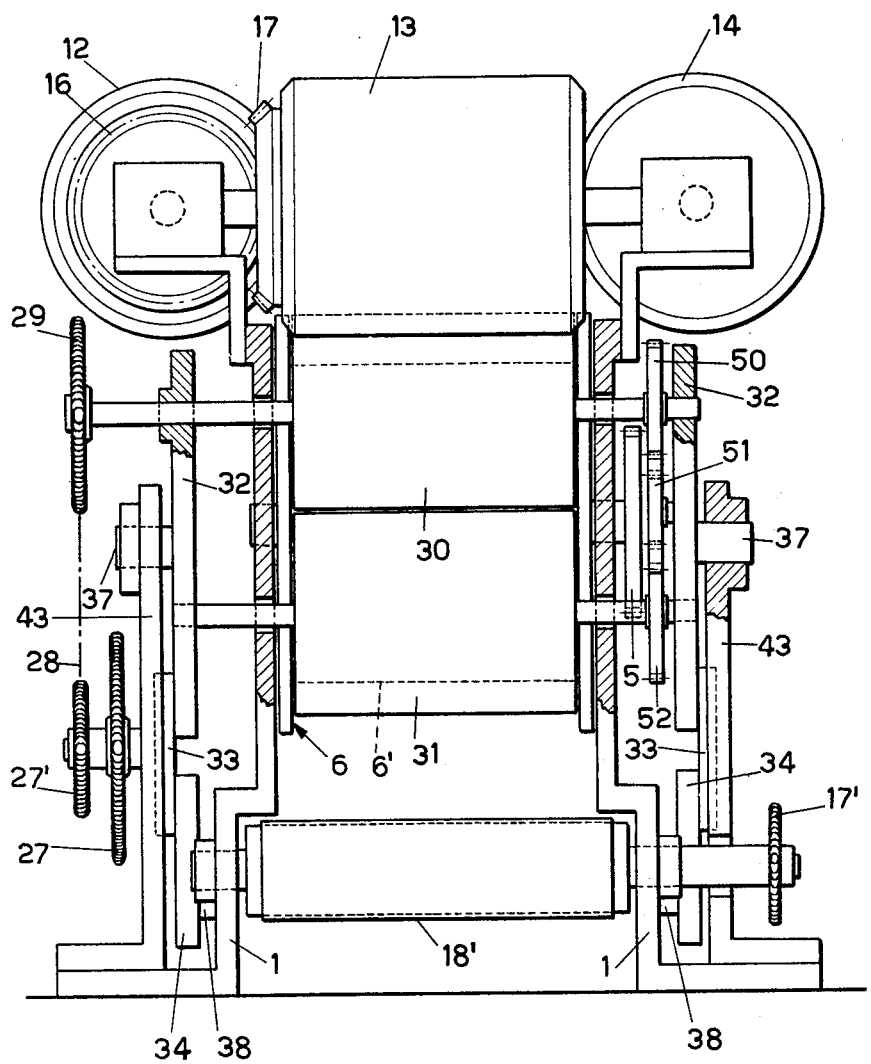
INVENTOR.
BY

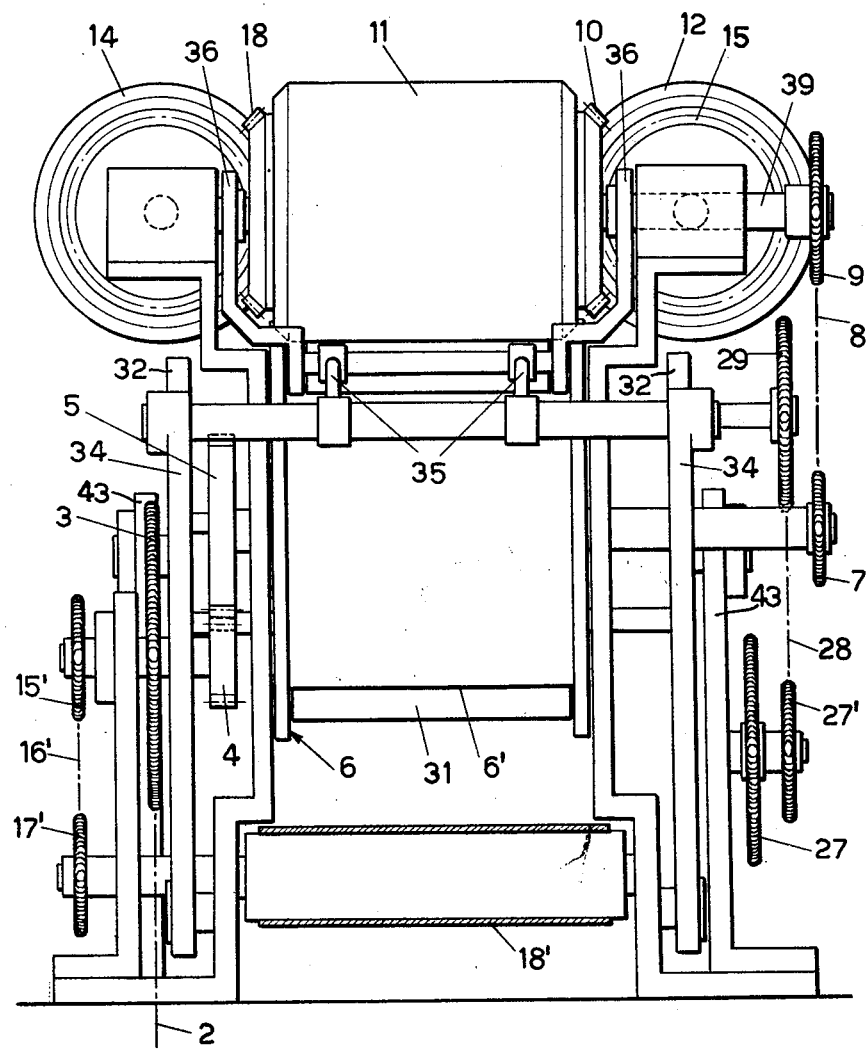

Nov. 3, 1964   L. MALAVASI   3,155,054
MACHINE FOR KNEADING RAISED DOUGH
Filed July 17, 1962   7 Sheets-Sheet 7
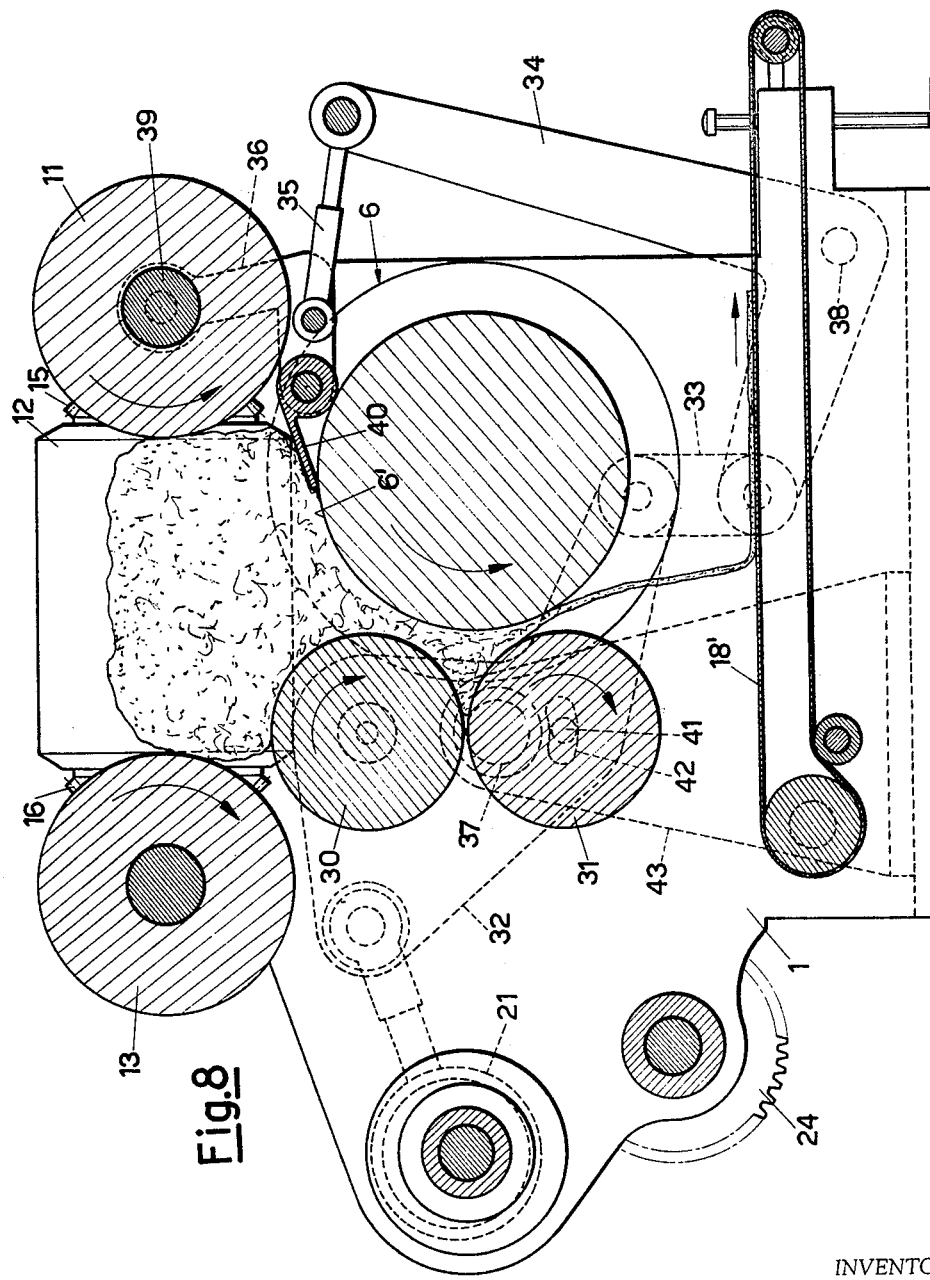
INVENTOR.
BY

United States Patent Office 3,155,054
Patented Nov. 3, 1964

3,155,054
MACHINE FOR KNEADING RAISED DOUGH
Leonida Malavasi, Via Temperanza 9, Milan, Italy
Filed July 17, 1962, Ser. No. 210,447
Claims priority, application Italy, Mar. 21, 1962,
5,535/62
2 Claims. (Cl. 107—12)

The present invention relates to a machine for kneading raised or leavened dough.

Doughs leavened with yeast are used not only in the production of bread, but also in many related products, such as, for example the so-called grissinis, breadsticks and the like.

Especially in the manufacture of grissini, there is the imperative requirement of avoiding appreciable loss of gas-retaining capacity by the dough without "killing the nerve" thereof, while still having a dough of suitable consistency to be passed through the processing equipment.

These apparently contrasting requirements have been hitherto only partially fulfilled by the known kneading machines, so that the preparation of grissini dough has been an operation which required special care and attention.

The principal object of the present invention is to provide a kneading machine for grissini dough capable of giving a dough of good consistency and good gas-retaining properties.

Another object is that of providing a kneading machine capable of simulating, as closely as practicable, the "manual kneading of the dough" which is so much appreciated by the lovers of the "traditional" bakery products.

Other objects, features and advantages of the machine made according to the invention will be readily apparent to those skilled in the art as the present disclosure proceeds. Broadly stated, the machine according to the present invention comprises, in combination, A main kneading roller, A first auxiliary kneading roller and a second auxiliary kneading roller, A first rocker arm, carrying said two auxiliary rollers in superposed relationship, and pivoted intermediate its ends in a position intermediate between the axes of said auxiliary rollers, A second rocker arm pivoted intermediate its ends in a position on the opposite side of the pivotal point of said first rocker arm with respect to the vertical diametrical plane of said main kneading roller and below the horizontal diametrical plane thereof, A third rocker arm pivoted about one of its ends in a position on the opposite side of the pivotal point of said first rocker arm with respect to the vertical diametrical plane of said main kneading roller and above the upper horizontal tangent plane thereof, Doctor means oscillably mounted about the free end of said third rocker arm and adapted to cooperate with the upper portion of the peripheral surface of said main kneading roller, Linking means between said first and said second rocker arms, Linking means between said second rocker arm and a point of said third rocker arms intermediate its ends, Means for imparting a rocking movement to said first rocker arm so as alternatingly to bring either of said auxiliary rollers in generally tangential relationship with said main kneading roller and said doctor means towards and away of said first auxiliary roller, and Means for independently rotating said main kneading roller and said first auxiliary roller.

In addition, means can be provided for varying, within a relatively narrow angular range, the position of the second auxiliary roller on the first rocker arm, as the production and quality necessities demand according to the different behavior of the dough being processed.

An exemplary embodiment of the machine according to the invention will be described hereinafter, this detailed description being aided by the accompanying drawings.

In the drawings:

FIG. 2 is a side elevational view of the machine, taken on the side opposite to that shown in FIG. 1;

FIG. 3 is a simplified diagram of the kneading mechanism proper, showing the position in which the first (or upper) auxiliary roller and the doctor blade concurrently approach the main kneading roller;

FIG. 4 is a simplified diagram, akin to that of FIG. 3, and shows the position in which the second (or lower) auxiliary roller approaches the main kneading roller and the doctor blade is in a retracted position with respect to the position shown on FIG. 3, FIG. 5 is a plan view of the machine shown in FIG. 1;

FIG. 6 is an end elevational view, partly in cross-section, of the machine, the view looking in the direction of the arrow $a$ in FIG. 1;

FIG. 7 is an end elevational view, partly in cross-section, of the machine, the view looking in the direction of the arrow $b$ in FIG. 1; and FIG. 8 is a vertical sectional view, with certain parts in elevation, showing the dough and its path of movement through the machine.

Detailed Description of the Machine

Figure 1:
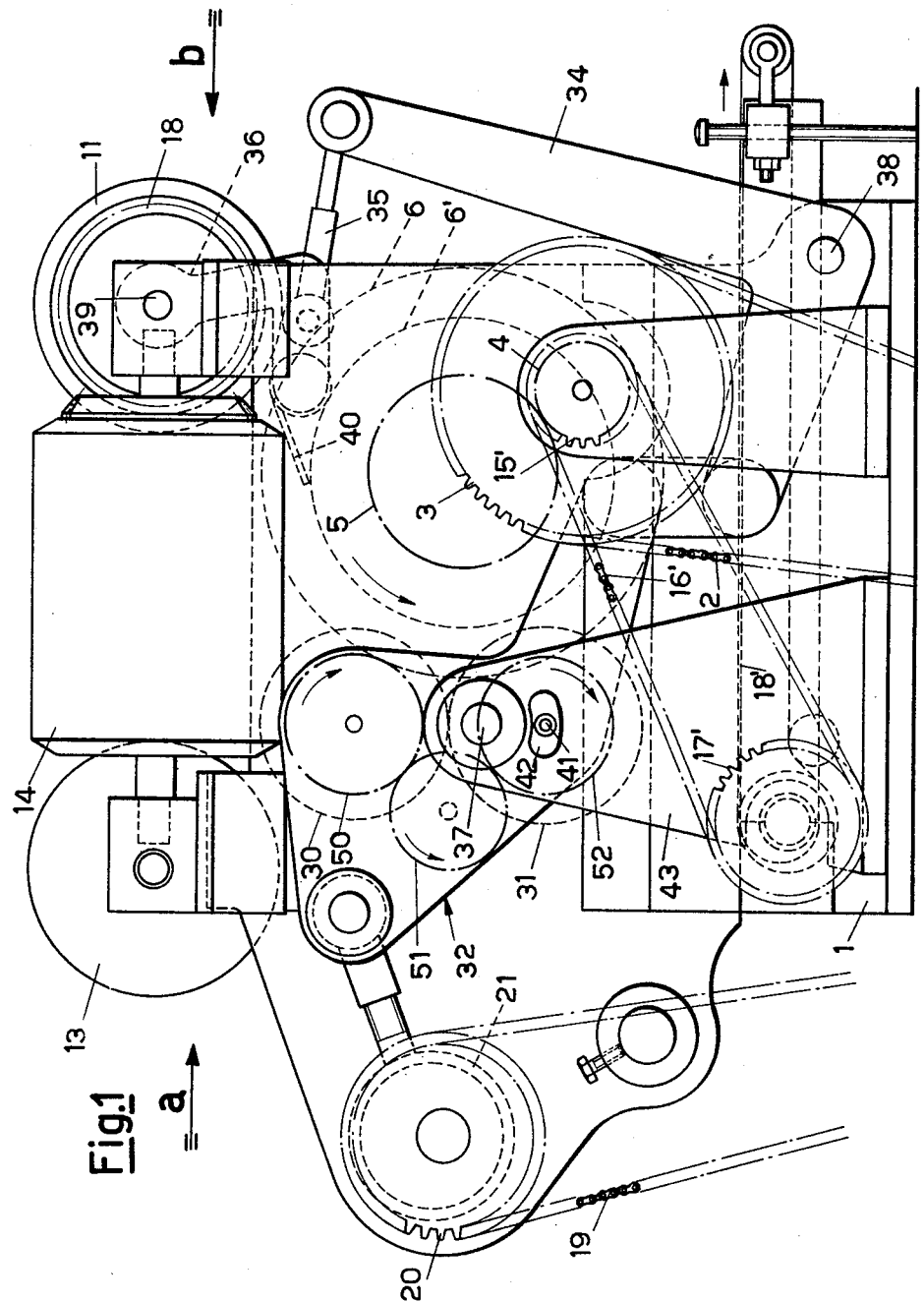
FIG. 1 is a side elevational view of the machine, according to a rather diagrammatic but complete showing.

Having first reference to FIG. 1, it will be noted that the machine is supported by a sturdy bed or framing 1, which carries all the mechanisms and the attendant prime movers. There are in the machine, two independent drive transfer lines, namely:

A first drive transfer line which serves the main kneading roller, the conveyor belt for carrying the kneaded dough away, and the upper rollers which receive the premixed dough.

A second drive transfer line which serves the eccentric for imparting the rocking movement to the rocking arm, and the first and the second auxiliary rollers. The second auxiliary roller is positively driven by the first auxiliary roller, but can also be idly mounted on the carrying arm if necessity demands, such as, for example, when particularly tough doughs are being processed.

The first drive transfer line comprises (FIGS. 1 and 7), in the order given, a prime mover (not shown and placed underneath the bed 1 of the machine), a chain 2 associated with the prime mover and trained over a sprocket 3, a spur gear 4 carried by the shaft for the sprocket 3, and meshes with a spur gear 5 fastened to main kneading roller 6. All these members serve to transmit the drive from the prime mover to the main kneading roller 6. From the kneading roller 6, via a sprocket 7 (FIG. 2) placed on the opposite side of the machine with respect to the drive transmitting means mentioned above, the drive is transmitted to upper rollers 11, 12, 13 and 14, via chain 8, sprocket 9 and bevel gears such as 10, 15, 16, 17, 18. The upper rollers (which are not themselves a part of the invention) are equal and their axes form the sides of a square: obviously, bevel gears are to be provided on the adjoining edges of three consecutive rollers out of the four rollers 11, 12, 13 and 14. Drive is also transmitted, via sprocket 15', chain 16' and sprocket 17' to a conveyor 18' which carries away the kneaded dough as it is continually delivered by the kneading assembly.

The second drive transfer line comprises, in the order given, a prime mover (distinct from that of the first line $a$), chain 19, sprocket 20 and eccentric 21: all these serve to impart the rocking motion to the first rocker arm and the mechanisms associated therewith which will later be described in detail.

On the opposite side of the eccentric 21, there is provided the remainder of the second drive transfer line. As shown in FIG. 2, the same includes sprocket 22, coaxial sprockets 24 and 25, chain 23 trained about sprockets 22 and 24, coaxial sprockets 27 and 27', chain 26 trained about sprockets 25 and 27, sprocket 29 and chain 28 trained about sprockets 27' and 29. The sprocket 29 (FIG. 6) is fast on the shaft of a first auxiliary roller 30. The drive from the roller 30 to a second auxiliary roller 31 is effected via gear 50 fast on the shaft of roller 30 which gear meshes with gear 51 and gear 51 meshes with gear 52 fast on the shaft of the roller 31.

A conventional chain tightening device 31', is provided to keep the chain 28 taut, to allow for the displacements due to the rocking movement of the kneading device proper. This will be detailedly described in the following.

*The Kneading Mechanism Proper (FIGS. 3 and 4)*

This mechanism is shown in detail in FIGS. 3 and 4 and comprises, in the order given, from the left to the right as viewed in the drawings:

The eccentric 21, a first rocker arm 32 carrying the first auxiliary roller 30 and the second auxiliary roller 31, a link 33, a second rocker arm 34, a link 35 and a third rocker arm 36. The latter rocker arm carries a swingable doctor blade 40 on its free end.

The rocker arm 32 is pivoted at 37, between the pivotal axes of the rollers 30 and 31, the rocker arm 34 is pivoted at 38, intermediate its ends, and the rocker arm 36 is pivoted at 39 on one of its ends, the other end being free and carrying the doctor blade 40 which is swingably affixed thereto so as to cooperate with upper active surface 6' of the main roller 6 which is flanged as shown in FIGS. 6 and 7.

In FIGS. 3 and 4, it will be seen also, that the pivot 38 of second rocker arm 34 lies on the opposite side of the vertical diametrical plane VD of the roller 6 with respect to the pivot 37 of first rocker arm 32, and below the horizontal diametrical plane HD thereof, whereas the pivot 39 of third rocker arm 36 is placed also away from the plane VD with respect to pivot 37, but above the upper horizontal tangent plane UT of the active surface 6' of roller 6. The pivots 37, 38 and 39 are in fixed position with respect to the machine bed 1. For example, pivot 37 can be affixed to a bracket such as 43.

The position of the roller 31 with respect to the rocker arm 32 can be varied by displacing pivot 41 along a slot 42 of the bracket 43. This arrangement has been schematically shown on FIGS. 3 and 4, since any conventional means (e.g. bolts and washers) can be used for this purpose.

*Operation of the Kneading Mechanism Proper (FIGS. 3 and 4)*

The rotation of the eccentric 21 causes the rocking movement of arm 32 to take place and thus, via link 33, arm 34, link 35 and arm 36, the rocking movements of arm 34 and arm 36 occur.

It will be seen that, due to the position of the pivots 37, 38 and 39, as the roller 30 approaches the surface 6', the rocker 36 also approaches so that the doctor blade 40 (which slides over surface 6' since it is swingable) will approach the roller 30. This movement simulates the manual movement of "collecting" the dough. As the eccentric 21 rotates and passes the dead centre, the reverse phenomenon takes place, that is to say roller 30 is kept relatively far from surface 6', whereas rocker 31 approaches surface 6' and the doctor blade 40 is retracted: this movement simulates the manual movement of "spreading" the dough. If one thinks of the whole manual kneading movement, it can be said that the swinging of the two auxiliary rollers 30, 31 imitates, say, the movement of the left hand and that of the doctor blade 40 that of the right hand of an operator who kneads the dough with his hands.

It is necessary that the dough feed rate to the kneading mechanism be, as far as practicable, constant: this requirement is fulfilled by the four rollers 11, 12, 13 and 14 which define a passageway of constant cross-sectional area and of constant feed rate as well. Possible slight residual increases or decreases of the dough bulk (due to the presence of yeast and other reasons) are then very easily and conveniently dominated by the operation of the kneading device proper, as described in detail hereinabove.

After kneading, the dough is moved to the other processing machines, via the conveyor 18', and then to the oven to be properly baked.

The products obtained from dough made with the device of this invention have shown characteristics of crispness and palatability hitherto obtainable only with the traditional hand-kneading procedure.

I claim:

1. A device for kneading raised dough, comprising, in combination,
    a main kneading roller,
    a first auxiliary kneading roller and a second auxiliary kneading roller,
    a first rocker arm, carrying said two auxiliary rollers in superposed relationship, and pivoted intermediate its ends in a position intermediate between the axes of said auxiliary rollers,
    a second rocker arm pivoted intermediate its ends in a position on the opposite side of the pivotal point of said first rocker arm with respect to the vertical diametrical plane of said main kneading roller and below the horizontal diametrical plane thereof,
    a third rocker arm pivoted about one of its ends in a position on the opposite side of the pivotal point of said first rocker arm with respect to the vertical diametrical plane of said main kneading roller and above the upper horizontal tangent plane thereof,
    doctor means oscillably mounted about the free end of said third rocker arm and adapted to cooperate with the upper portion of the peripheral surface of said main kneading roller,
    linking means between said first and said second rocker arms,
    linking means between said second rocker arm and a point of said third rocker arms intermediate its ends,
    means for imparting a rocking movement to said first rocker arm so as alternatingly to bring either of said auxiliary rollers in generally tangential relationship with said main kneading roller and said doctor means towards and away of said first auxiliary roller, and
    means for independently rotating said main kneading roller and said first auxiliary roller.

2. A device as claimed in claim 1, wherein the position of said second auxiliary kneading roller on said first rocker arm is adjustable.

References Cited in the file of this patent
UNITED STATES PATENTS
2,619,048    Fox _____ Nov. 25, 1952